(12) United States Patent
Horowitz (10) Patent No.: US 11,608,098 B1
(45) Date of Patent: Mar. 21, 2023

(54) WAGON WITH COMBINATION FOLDOVER ARTICLE TRANSPORT AND TABLE FLAPS

(71) Applicant: Brian Horowitz, Mission Viejo, CA (US)

(72) Inventor: Brian Horowitz, Mission Viejo, CA (US)

( * ) Notice: Subject to any disclaimer, the term of this patent is extended or adjusted under 35 U.S.C. 154(b) by 0 days.

(21) Appl. No.: 17/716,678

(22) Filed: Apr. 8, 2022

(51) Int. Cl.
*B62B 3/02* (2006.01)
*B62B 3/00* (2006.01)

(52) U.S. Cl.
CPC .............. *B62B 3/004* (2013.01); *B62B 3/007* (2013.01); *B62B 3/025* (2013.01); *B62B 2206/006* (2013.01)

(58) Field of Classification Search
CPC ....... B62B 3/004; B62B 3/007; B62B 3/1436; B62B 3/1468; B62B 2206/006
See application file for complete search history.

(56) References Cited

U.S. PATENT DOCUMENTS

| | | | | |
|---|---|---|---|---|
| 2,603,500 A | * | 7/1952 | Messier | A47B 31/00 280/30 |
| 3,873,114 A | * | 3/1975 | Brown | A47B 31/00 280/30 |
| 5,201,536 A | * | 4/1993 | Bono | B62B 1/12 280/30 |
| 5,285,656 A | * | 2/1994 | Peters | A45C 5/14 220/666 |
| 5,306,029 A | * | 4/1994 | Kaiser, II | A47B 31/02 280/30 |
| 5,431,298 A | * | 7/1995 | Ahn | A45C 9/00 220/756 |
| 5,480,170 A | * | 1/1996 | Kaiser, II | A47B 31/02 280/30 |
| D369,695 S | * | 5/1996 | Imotani | D6/686 |
| 5,551,558 A | * | 9/1996 | Bureau | A45C 11/20 312/258 |
| 5,803,472 A | * | 9/1998 | Lien | A45C 5/14 206/223 |
| 5,857,695 A | * | 1/1999 | Crowell | B62B 3/007 280/47.11 |
| 5,865,334 A | * | 2/1999 | Ruiz | B65D 85/48 206/451 |
| 5,876,047 A | * | 3/1999 | Dennis | B62B 3/007 280/47.35 |
| 6,105,980 A | * | 8/2000 | Cino | B62B 3/02 206/505 |

(Continued)

*Primary Examiner* — Katy M Ebner
(74) *Attorney, Agent, or Firm* — Morland C. Fischer (57) ABSTRACT

Disclosed is a wagon having a basket with an open top through which articles are received to be transported by the wagon. The wagon has a pair of article transport and table flaps that are connected to the top of the basket. The flaps initially hang downwardly against the opposite sides of the basket at which to carry different articles. The flaps are adapted to rotate from a location at the sides of the basket to a location above the top of the basket at which the flaps are connected by zipper fasteners to one another to create a cover to close the top of the basket and form a table extending across the basket. A pull-out rack is carried by the wagon below the basket to be pulled outwardly from the back of the wagon at which to transport another article such as a cooler.

17 Claims, 9 Drawing Sheets

(56) References Cited

U.S. PATENT DOCUMENTS

| | | | |
|---|---|---|---|
| 6,216,488 B1* | 4/2001 | Rucker | A45B 11/00 62/331 |
| 6,328,179 B1* | 12/2001 | Conrado | F25D 3/06 220/592.2 |
| 6,354,611 B1* | 3/2002 | Mihalic | B62B 3/02 280/47.11 |
| 6,431,580 B1* | 8/2002 | Kady | B62B 1/125 280/655 |
| 6,536,796 B1* | 3/2003 | Solomon | B62B 3/02 280/655 |
| 6,726,050 B1* | 4/2004 | Barentine | A22C 25/06 220/23.6 |
| 7,387,305 B2* | 6/2008 | Vanderberg | B62B 1/006 280/47.24 |
| 7,451,709 B2* | 11/2008 | Swartfager | F25D 23/12 220/592.2 |
| 7,766,179 B2* | 8/2010 | George | A45C 5/14 280/30 |
| 8,069,939 B1* | 12/2011 | Metzler | B62B 3/007 280/47.35 |
| 8,191,907 B2* | 6/2012 | Watson | B62B 3/02 280/30 |
| 8,453,771 B1* | 6/2013 | Hirschfeld | B60L 8/003 180/19.1 |
| 8,544,872 B2* | 10/2013 | Vanderberg | B62B 3/10 280/655.1 |
| 8,556,740 B1* | 10/2013 | Schneider | B62B 3/003 472/126 |
| 8,875,854 B2* | 11/2014 | Zuckerman | A45C 9/00 5/116 |
| 9,101,206 B1* | 8/2015 | Chen | B62B 5/0013 |
| 9,145,154 B1 | 9/2015 | Horowitz | |
| 9,392,766 B1* | 7/2016 | Elden | B62B 3/106 |
| 9,440,668 B1* | 9/2016 | Chen | B62B 5/0013 |
| 9,623,890 B1* | 4/2017 | Horowitz | B62B 3/007 |
| 9,694,837 B2* | 7/2017 | Ryan | B62B 3/022 |
| 9,731,779 B2* | 8/2017 | Lamb | B62B 5/0033 |
| 10,040,470 B1 | 8/2018 | Horowitz | |
| 10,300,933 B2* | 5/2019 | DeBry | B62B 3/005 |
| 10,371,429 B1* | 8/2019 | Winters Giesting | F25D 3/08 |
| 10,457,310 B2* | 10/2019 | Sturgeon | B62B 3/106 |
| 11,084,513 B1* | 8/2021 | Tschiggfrie | B62B 3/02 |
| 11,116,297 B1* | 9/2021 | Latham | B65D 81/02 |
| 11,235,794 B1* | 2/2022 | Ciccarelli | B62B 3/002 |
| 11,365,927 B1* | 6/2022 | Winters Giesting | B65D 43/161 |
| 2003/0221924 A1* | 12/2003 | Tong | A45C 11/20 190/110 |
| 2005/0006861 A1* | 1/2005 | Dubois | B62B 3/16 280/33.998 |
| 2006/0065665 A1* | 3/2006 | Swartfager | F25D 23/12 220/592.2 |
| 2006/0169690 A1* | 8/2006 | Rothschild | A47G 9/062 220/7 |
| 2010/0102524 A1* | 4/2010 | Larsen | B62B 5/0013 280/47.35 |
| 2011/0127796 A1* | 6/2011 | Fontenot-Martin | B62B 3/1436 296/100.01 |
| 2011/0226003 A1* | 9/2011 | Chaney | B62B 1/20 62/457.7 |
| 2014/0077467 A1* | 3/2014 | Galante | B62B 5/00 280/35 |
| 2014/0300069 A1* | 10/2014 | Logvin | B62B 3/007 280/35 |
| 2015/0076799 A1* | 3/2015 | Ryan | B62B 5/0457 493/162 |
| 2015/0114959 A1* | 4/2015 | Fritz | B65D 21/0213 220/7 |
| 2018/0237046 A1* | 8/2018 | Bovino | B62B 5/0013 |
| 2019/0216193 A1* | 7/2019 | Kabalin | A45C 7/0077 |
| 2019/0254399 A1* | 8/2019 | Rajvansh | B62G 5/064 |
| 2019/0276063 A1* | 9/2019 | Sturgeon | B62B 3/106 |
| 2021/0362763 A1* | 11/2021 | Etzelsberger | B62K 27/003 |

* cited by examiner

WAGON WITH COMBINATION FOLDOVER ARTICLE TRANSPORT AND TABLE FLAPS

BACKGROUND OF THE INVENTION

1. Field of the Invention

This invention relates to a wagon that is capable of being folded from an expanded open configuration at which a variety of articles can be carried to a compact collapsed configuration at which to facilitate the storage or transport of the wagon when it is not being used. Article transport flaps which initially hang downwardly over and against the opposite sides of a basket of the wagon are adapted to be rotated above the basket at which to be connected to one another to create a continuous cover to close the open top of the basket and thereby form a table thereacross. A pull-out article transport rack is carried by the wagon below the basket at which to be available to transport articles such as a cooler which may not easily fit into the basket.

2. Background Art

Folding wagons are known which are capable of being folded between open and collapsed configurations. Such folding wagons typically have a fabric basket in which a variety of articles or small children can be carried when the wagon is unfolded for use in its opened configuration. Examples of such folding wagons are available by referring to U.S. Pat. No. 9,145,154 issued Sep. 29, 2015 and U.S. Pat. No. 10,040,470 issued Aug. 7, 2018.

In each of the patents referred to above, the wagon has a basket with a top that is open so that articles can be received by the basket or removed therefrom. However, there is nothing carried by the wagon which can be easily used to create a cover for the basket to close the open top thereof. Consequently, the articles being transported within the basket are constantly exposed to the elements including rain and strong sunlight which could damage the articles. Likewise, there is nothing to prevent the articles from falling out or being removed without permission from the basket through the open top. What is even more, if food is being carried within the basket for consumption out of doors, a table may not be readily available to enable the food and eating utensils to be accessed by picnic goers and like individuals. Therefore, what would be desirable is a wagon that carries with it a conveniently accessible and easy to use cover that can be removably deployed over the basket to close the open top thereof so as to prevent access to the contents being transported therewithin while, at the same time, creating a table on which the contents carried by the basket can be laid out.

SUMMARY OF THE INVENTION

This invention relates to a wagon which is ideally but not necessarily a folding wagon that is capable of being folded from an expanded open configuration during use to a compact collapsed configuration at which to facilitate storage or transport when the wagon is not in use. The wagon includes a basket that sits on a basket support rack and has an open top through which articles to be transported by the wagon can be received by or removed from the basket. One half of a zipper runs across the top of each of the opposite sides of the wagon basket. In a preferred embodiment, a pair of combination article transport and table flaps are located at the opposite sides of the basket. Each article transport flap has one or more pockets in which a variety of articles can be carried. Each article transport flap also has one half of an upper zipper and one half of a lower zipper running across the top and the bottom thereof. The upper and lower zippers of the pair of article transport flaps are complementary to each other and to the zippers that run across the sides of the basket.

The pair of article transport flaps are detachable connected to the wagon by mating the upper zippers that run across the top of the flaps to respective ones of the complementary zippers that run across the opposite sides of the basket such that the flaps initially hang downwardly along and against the sides. When it is desirable to close the open top of the basket, the pair of article transport flaps are folded upwardly at their upper zippers so as to rotate above the basket. The lower zippers that run across the bottom of the flaps are now mated to one another. By virtue of the foregoing, the flaps are detachably connected together to create a continuous cover over the top of the wagon basket to prevent access to the articles being transported therewithin and to simultaneously form a table on which the contents of the basket can be laid.

A pull-out rack is coupled to the basket support rack at the back of the wagon. The pull-out rack is slidable relative to the basket support rack in response to pushing and pulling forces applied thereto from a retracted position lying below the wagon basket to an extended position projecting outwardly from the wagon and rearwardly of the basket. When the pull-out rack has been pulled out to its extended position, a flat bed is available on which an article (e.g., a cooler) may be transported at the back of the wagon.

DESCRIPTION OF THE PREFERRED EMBODIMENT

Referring initially to FIGS. 1-4 of the drawings, there is shown a folding wagon 1 that is adapted to be folded between an expanded open configuration during use and a compact collapsed configuration at which to facilitate the wagon being stored or transported when it is not in use. Examples of folding wagons like that referred to above are available by referring to my prior U.S. Pat. No. 9,145,154 issued Sep. 29, 2015 and U.S. Pat. No. 10,040,470 issued Aug. 7, 2018. Therefore, the teachings of my prior patented wagons are incorporated herein by reference such that only a short description of the folding wagon 1 shown in FIGS. 1-4 will be provided below. Despite the fact that reference has been and will continue to be made to a wagon that is foldable between open and collapsed configurations, it is to be understood that the improvements to the wagon that are to be described herein are also applicable to wagons that do not fold.

The folding wagon 1 includes a fabric basket 3 within which to carry a variety of articles including, but not limited to, sporting and camping goods, picnic supplies, business inventory and even small children. The fabric basket 3 is open at the top and closed along the bottom, front, rear and sides. The basket 3 shown in FIGS. 1-4 is supported by a folding frame which includes a flat basket support rack 5 that lies at the bottom of the wagon 1. The basket support rack 5 has opposite rear and front ends 7 and 9 that are pivotally connected together and capable of being rotated towards one another so as to lie face-to-face (not shown) in response to an uplifting pulling force applied thereto when the wagon is being folded to its compact collapsed configuration.

In the case where the wagon 1 does not fold, the basket support rack 5 will at all times remain flat such that the opposite ends 7 and 9 thereof are stationary and do not rotate towards and away from one another. Regardless of whether the wagon 1 is folded, the frame shown in FIGS. 1-4 holds the basket 3 up so that it can be seated on the basket support rack 5. Reference may be made to my aforementioned U.S. Pat. Nos. 9,145,154 and 10,040,470 for details to explain the attachment of the basket 3 to the wagon frame so that the basket 3 is held above the basket support rack 5.

The identical sides of the wagon frame which lie adjacent opposite sides of the wagon basket 3 include a first pair of diagonally extending side support arms 10 and 11 and a second pair of diagonally extending side support arms 12 and 13. The first pair of diagonal side support arms 10 and 11 are connected to one another at first ends thereof by means of an upper pivot coupling 14, so that the support arms 10 and 11 project upwardly to make an angle of about 90 degrees. The second pair of diagonal side support arms 12 and 13 are also connected to one another at first ends thereof by means of a lower pivot coupling 16, so that the support arms 12 and 13 project downwardly to make an angle of about 90 degrees. The diagonally extending side support arms 10 and 12 are coupled to one another about midway between the first and opposite ends thereof by means of a first intermediate pivot coupling 18, and the diagonally extending side support arms 11 and 13 are coupled to one another about midway between the first and opposite ends thereof by means of a second intermediate pivot coupling 20. A pull-down strap 21 runs from each side of the basket 3 to the lower pivot coupling 16 to hold the basket 3 down against the basket support rack 5.

The opposite end of the side support arm 11 of the first pair of side support arms 10 and 11 is connected to one end of a rear wheel support track 22. The rear wheel support track 22 is spaced from and located behind the basket support rack 5 at which a pair of rear wheels 24 of the wagon 1 are mounted. Each rear wheel 24 is attached by means of a rear wheel bracket 25 to a collar 26 that surrounds and is slidable back and forth along the rear wheel support track 22. The collars 26 ideally slide towards one another so that in the case where the wagon 1 will be folded, the rear wheels 24 move together to enable the wagon 1 to be folded into its compact collapsed configuration.

Figure 4:
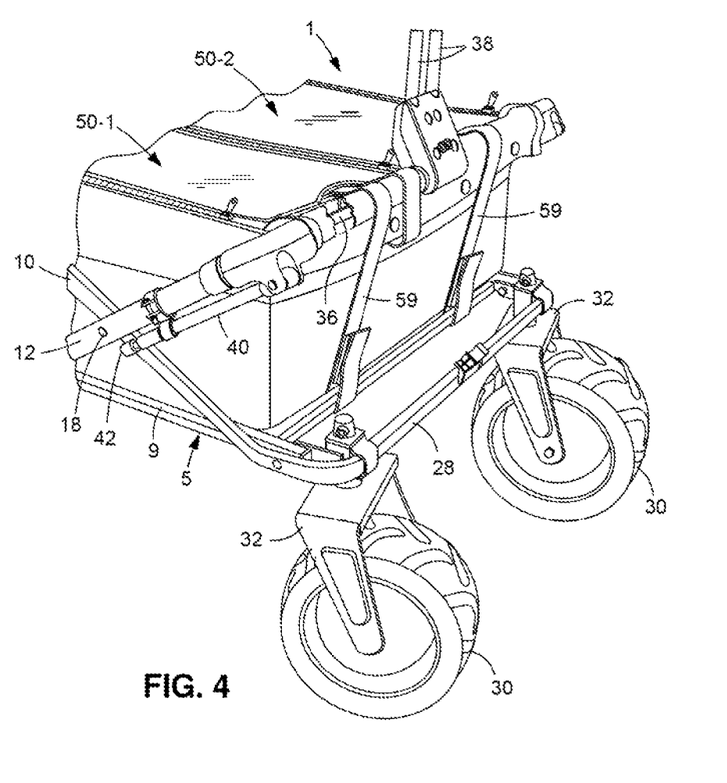
FIG. 4 shows the back of the wagon with the article transport flaps covering the top of the basket to create the table thereacross.

The opposite end of the side support arm 10 of the first of the pair of side support arms 10 and 11 of the wagon frame bends continuously around the front of the folding wagon 1 at which to form a front wheel support track 28 (best shown in FIG. 4). The front wheel support track 28 is spaced from and located ahead of the basket support rack 5 at which a pair of front wheels 30 of the folding wagon 1 are mounted. Each front wheel 30 is fixedly connected to the front wheel support track 28 by means of a pivotal front wheel bracket 32.

A horizontal extension (designated 34 in FIG. 1) of the side support arm 13 of the second pair of side support arms 12 and 13 of the wagon frame bends continuously around the rear of the wagon 1. The rear of the basket 3 is wrapped around the horizontal extension 34 of the side support arm 13 where it is folded over and back upon itself in order to hold the basket 3 up and stand above the basket support rack 5.

Likewise, a horizontal extension (designated 36 in FIG. 4) of the side support arm 12 of the second pair of side support arms 12 and 13 bends continuously around the front of the folding wagon 1. The front of the basket 3 is wrapped around the horizontal extension 36 of the side support arm 12 where it is folded over and back upon itself in order to also hold the basket 3 up so as to stand above the basket support rack 5.

A wagon transport handle 38 is pivotally connected to the basket support extension 36 at the front of the wagon 1 (best shown in FIG. 4). A pulling force or a pushing force is applied to the wagon transport handle 38 by a user to cause the pairs of rear and front wheels 24 and 30 to roll over a surface by which the wagon 1 can be transported from place-to-place in a forward or backward direction.

Figures 1, 1A:
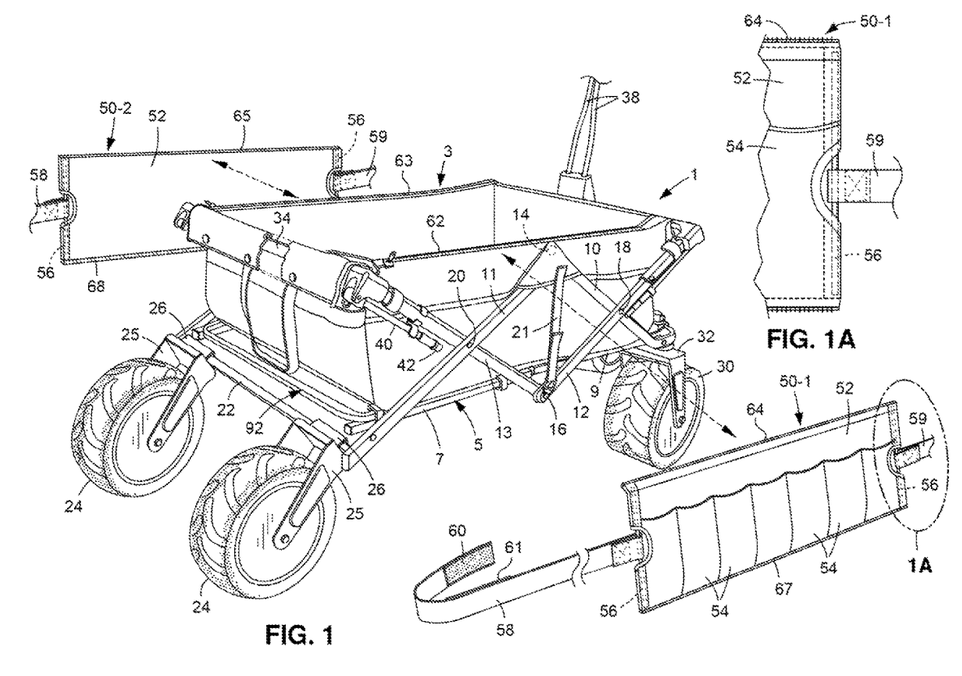
FIG. 1 shows a wagon having a combination foldover article transport and table flap according to a preferred embodiment to be attached to and lie against each of the opposite sides of a basket of the wagon.
FIG. 1A is an enlarged detail taken from FIG. 1 to show a tie down tension strap attached to one side of one of the article transport and table flaps.

As in the case of the wagon described in my aforementioned U.S. Pat. No. 9,145,154, the wagon 1 shown in FIGS. 1-4 may or may not carry an optional overhead canopy (not shown) to be removably attached to the wagon 1 so as to be held above the open top of the basket 3. If one is included, the canopy is removably attached to the wagon 1 by four canopy mounts, each of which including a hollow, rotatable and relatively wide cylindrical canopy mounting post 40 and a relatively narrow telescoping canopy support rod 42 that is slidably received within the mounting post 40. A combination canopy mounting post 40 and telescoping canopy support rod 42 is pivotally coupled to each one of the four corners of the frame of the wagon 1. Each canopy mounting post 40 is adapted to be rotated from an out-of-the-way position extending downwardly and lying below the top of the basket 3 as shown in FIG. 1 when the canopy is separated from the wagon to a deployed position standing upwardly and above the top of the basket 3 (not shown). With the canopy mounting post 40 standing upwardly, the telescoping canopy support rod 42 is pulled outwardly from post 40 to hold a corresponding corner of the canopy above the basket 3. Despite this description, the overhead canopy plays no role in the invention herein disclosed.

Continuing to refer to FIGS. 1-4, a first example of a combination foldover article transport and table flap is shown. One article transport flap from a pair of flaps 50-1 and 50-2 is carried at each side of the wagon 1. As will now be described, the pair of flaps 50-1 and 50-2 at respective sides of wagon 1 are adapted to be folded (i.e., rotated) upwardly from the sides of the wagon so as to move towards one another by which to lie over the top of the basket 3. The flaps 50-1 and 50-2 are further adapted to be detachably connected one to the other so as to establish a continuous cover to close the top of the basket 3 and thereby prevent access to the contents being transported therewithin while simultaneously creating a table across the basket.

Figure 2:
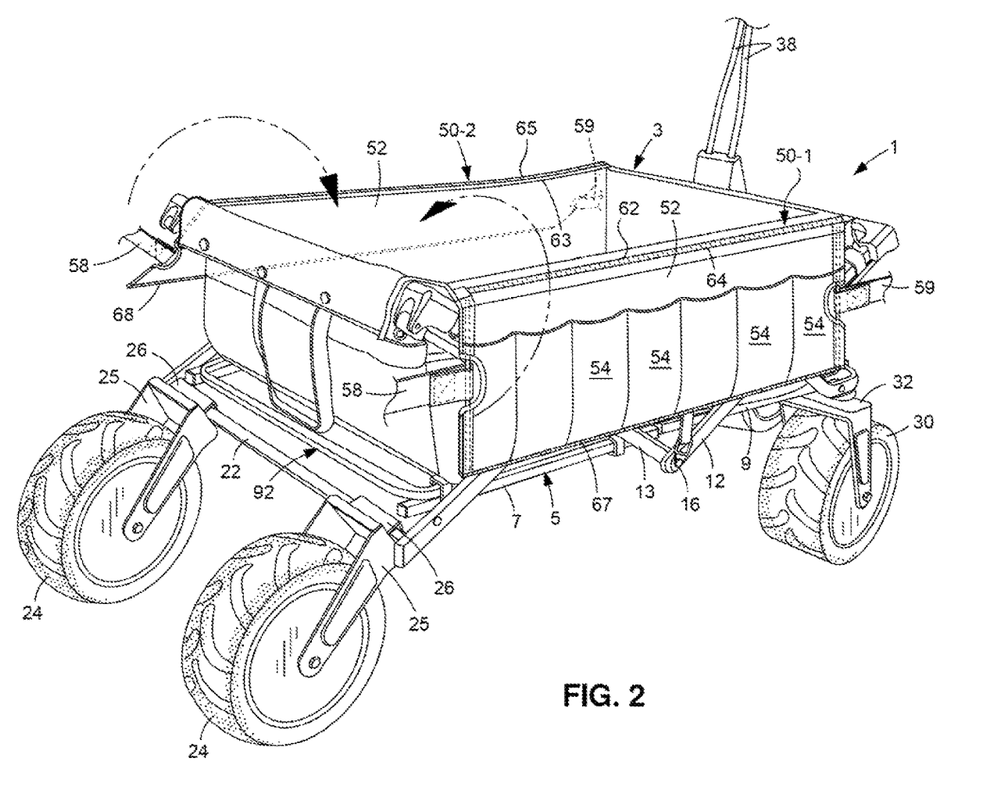
FIG. 2 shows the wagon of FIG. 1 with the article transport and table flaps being rotatable from a position lying against the sides of the wagon basket to a position lying above the top of the basket.

In the first example of FIGS. 1-4, the flaps 50-1 and 50-2 of each combination described above include an elongated backing 52 of flexible material that is sized to lie over and against one side of the wagon basket 3 (best shown in FIG. 2). One or more pockets 54 extend laterally across the backing 52 between opposite sides thereof. The pockets 54 may have the same or a different size. The pockets 54 are configured to carry any of a variety of articles including but not limited to tools, cooking and eating utensils, and snacks. However, the number and the contents of the pockets 54 of the flaps 50-1 and 50-2 are not to be considered a limitation of this invention.

As is best shown in FIG. 1A, a coupling rod 56 runs vertically through each of the opposite sides of the flaps 50-1 and 50-2. First ends of a pair of tie down tension straps 58 and 59 are attached to the coupling rods 56 at each side of flaps 50-1 and 50-2. A hook and a loop (i.e., Velcro) fastener 60 is attached to the opposite ends of each of the tie down tension straps 58 and 59. An intermediate Velcro fastener 61 (best shown in FIG. 1) is attached to each strap 58 and 59 between the first and opposite ends thereof.

As is best shown in FIG. 1, one half of a conventional zipper fastener 62 and 63 runs across of the top of each side of the wagon basket 3. A complementary upper zipper fastener 64 and 65 runs across the top of each of the pair of flaps 50-1 and 50-2. As is best shown in FIG. 2, the upper zipper fastener 64 at the top of a first flap 50-1 is detachably connected to the complementary zipper fastener 62 at the top of a first side of the wagon basket 3. Likewise, the upper zipper fastener 65 at the top of the second flap 50-2 is detachably connected to the complementary zipper fastener 63 at the top of the opposite side of the wagon basket 3.

As is also best shown in FIG. 1, a lower zipper fastener 67 runs across the bottom of the first flap 50-1 opposite the upper zipper fastener 64 that runs across the top. Similarly, a lower zipper fastener 68 runs across the bottom of the second flap 50-2 opposite the upper zipper fastener 65 that runs across the top. The function of the upper and lower zipper fasteners 64, 67 and 65, 68 that run across the top and bottom of respective ones of the pair of flaps 50-1 and 50-2 will now be explained.

When it is desirable for the top of the basket 3 of the wagon 1 to remain open to allow contents to be added or removed, the combination article transport and table flaps 50-1 and 50-2 hang downwardly from the opposing zipper pairs 62, 64 and 63, 65 to lie over and against the sides of the wagon in the manner shown in FIG. 2. In this case, the tie down tension straps 58 from one side of the pair of flaps 50-1 and 50-2 are moved towards one another around the back of the basket 3 to be detachably mated to one another at the (Velcro) fasteners 60 thereof. Likewise, the tie down tension straps 59 from the opposite side of the pair of flaps 50-1 and 50-2 are moved towards one another around the front of the basket to be detachably mated to one another at the fasteners 60 thereof.

Figure 3:
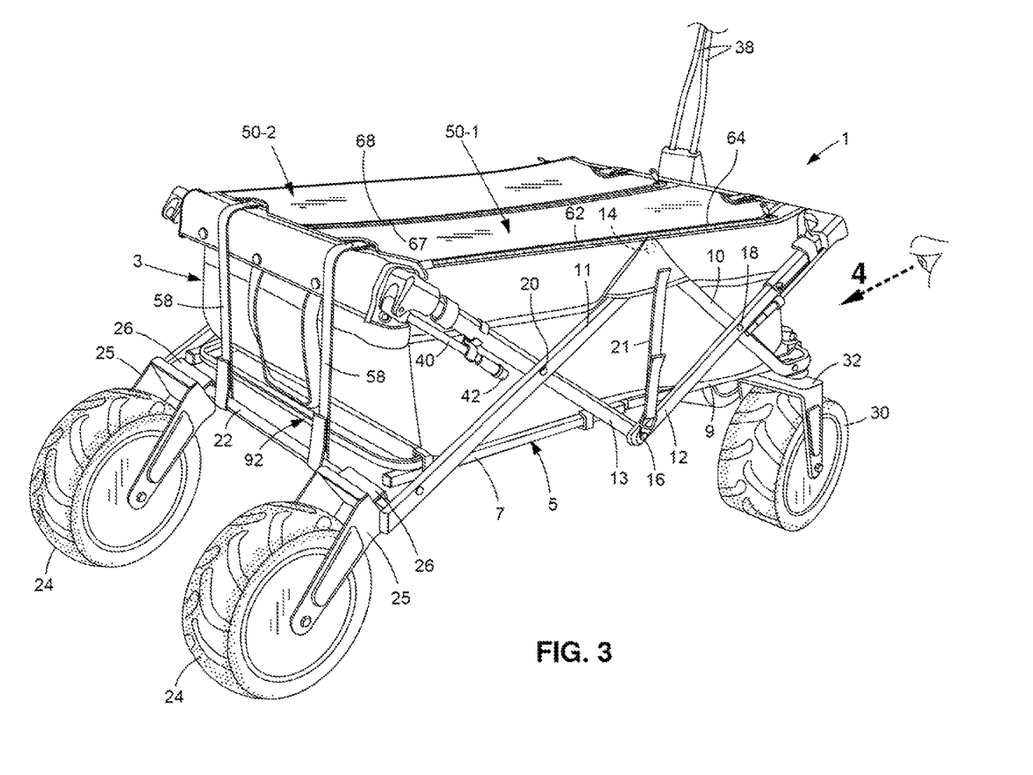
FIG. 3 shows the wagon with the article transport and table flaps connected to one another to cover the basket and thereby create a table extending across the top of the basket.

However, it may be desirable for the top of the wagon basket 3 to be closed rather than remain open as in the case described above when the pair of flaps 50-1 and 50-2 are held down by the tie down tension straps 58 and 59 so as to lie over and against the opposite sides of the basket in the manner shown in FIG. 2. To close the top of the basket 3, the flaps 50-1 and 50-2 are folded upwardly at the opposing zipper pairs 62, 64 and 63, 65 so as to rotate towards one another above the basket 3. Referring in this regard to FIG. 3, the pair of flaps 50-1 and 50-2 are shown detachably connected one to the other by mating together the lower zippers 67 and 68 that run across the bottom of the flaps. At the same time, the tie down tension straps 58 and 59 which extend from opposite sides of each of the pair of flaps 50-1 and 52 are wrapped around the rear wheel support track 22 of FIG. 3 and the rear end 9 of the basket support rack 5 of FIG. 4. The Velcro fasteners 60 and 61 shown in FIG. 1 are mated to one another to connect straps 58 and 59 to the frame of the wagon and thereby hold the flaps in place under tension. Accordingly, the pair of flaps 50-1 and 50-2 now create a continuous cover over the top of the wagon basket 3 to prevent access to the contents thereof while simultaneously forming a taut table extending over and across the basket.

Figure 5:
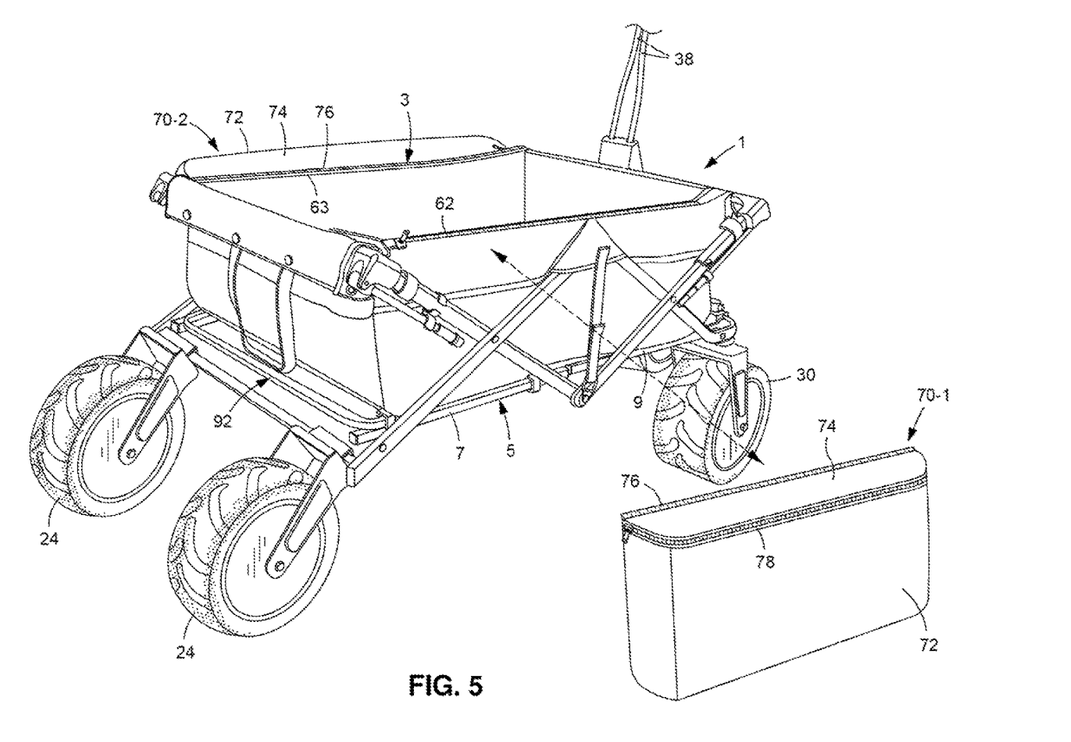
FIG. 5 shows the wagon of FIG. 1 having an article transport flap to be attached to one side of the wagon basket according to a first alternate embodiment.
Figure 6:
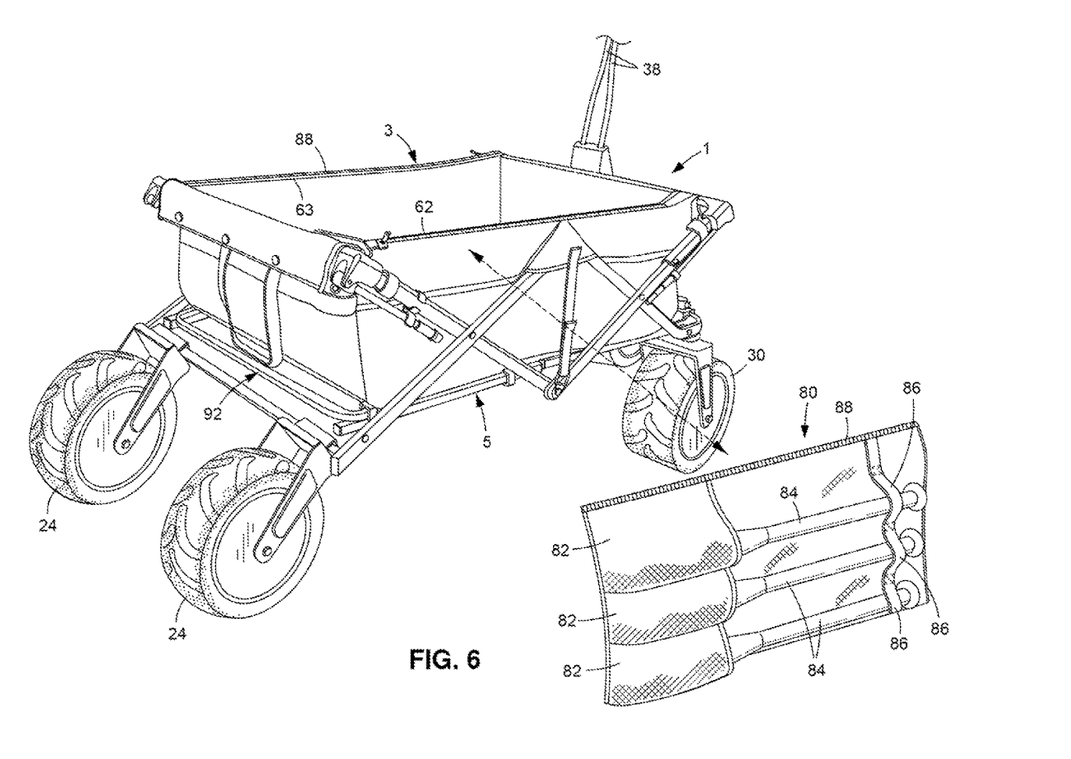
FIG. 6 shows the wagon of FIG. 1 having an article transport flap to be attached to one side of the wagon basket according to a second alternate embodiment.
Figures 7, 8:
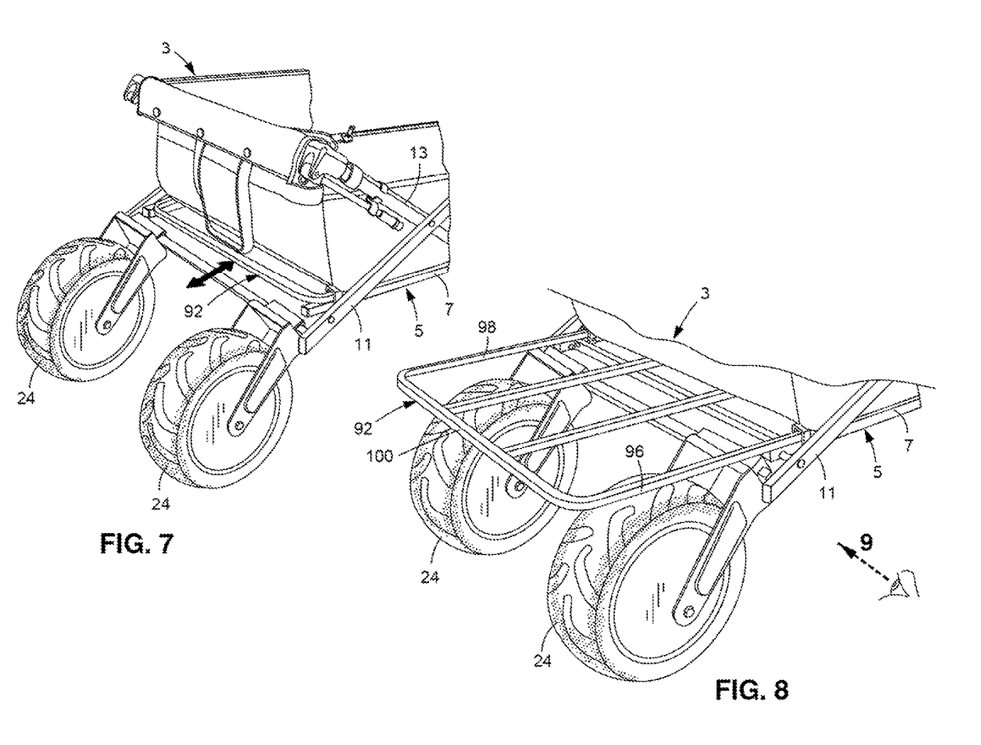
FIG. 7 shows the back of the wagon with a pull-out rack pushed in and lying at a retracted position below the basket of the wagon.
FIG. 8 shows the pull-out rack of FIG. 7 pulled out and lying at an extended position projecting rearwardly from the wagon.

FIGS. 5 and 6 of the drawings show other examples of article transport flaps 70-1, 70-2 and 80 that may be used in place of the pair of flaps 50-1 and 50-2 shown in FIGS. 1-4. However, unlike the flaps 50-1 and 50-2, the article transport flaps 70-1, 70-2 and 80 are not adapted to be folded over the open top of the basket 3 to create a cover by which to close the basket and simultaneously form a table thereacross. Nevertheless, the flaps 70-1, 70-2 and 80 are adapted to carry one or more of a variety of articles in addition to the contents being carried by the wagon basket 3.

Turning first to the example of FIG. 5, identical article transport flaps 70-1 and 70-2 are shown to be removably attached to the basket 3 of the wagon 1 at the opposite sides thereof. Each flap 70-1 and 70-2 is preferably a cooler pouch 72 in which beverages and ice can be carried. The pouches 72 are closed by a removable cover 74 that lies over the top of each. One half of a zipper 76 runs across one side of the cover 74 of each of the pouches 72. The zipper 76 is complementary to the previously described zippers 62 and 63 that run across the sides of the wagon basket 3. Another zipper 78 runs around the remaining sides of each cover 74. By operating one of the zippers 78, the cover 74 lying over the corresponding pouch 72 can be opened or closed to either allow or prevent access to the beverages being transported therein.

To attach one of the cooler pouches 72 of the article transport flaps 70-1 or 70-2 to the wagon basket 3, the zipper 76 at the cover 74 of the pouch 72 is mated to one of the complementary zippers 62 or 63 at the top of one of the sides of the basket. Accordingly, one or both of the flaps 70-1 and 70-2 of FIG. 5 will now hang downwardly from the pairs of opposing zippers 62, 76 and 63, 76 so that the pouches 72 lie over and against the sides of the basket 3.

Turning now to the example of FIG. 6, another article transport flap (only one of which 80 being shown) is removably attached to the basket 3 of the wagon 1 at each of the opposite sides thereof. In this case, each flap 80 includes a series of pockets 82 that are positioned one above the other in which to receive one end of each of the articles 84 to be carried. Where the articles 84 are long as in the case of a baseball bat, a series of attachment loops 86 are attached to the flap 80 to lie one above the other in order to hold the opposite ends of the articles in place. One half of a zipper 88 runs across the top of each article transport flap 80. The zipper 88 is complementary to the zippers 62 and 63 that run across the sides of the wagon basket 3.

To attach one of the article transport flaps 80 to the wagon basket 3, the zipper 88 at the top of the flap 80 is mated to one of the complementary zippers 62 or 63 at the top of one of the sides of the basket. Accordingly, as in the case of the article transport flaps 70-1 and 70-2 of FIG. 5, one or both of the article transport flaps 80 of FIG. 6 will now hang downwardly from the pairs of opposing zippers 62, 88 and 63, 88 so that the articles carried thereby lie over and against the sides of the basket 3.

FIGS. 7-10 of the drawings show a pull-out rack 92 that is coupled to the rear end 7 of the basket support rack 5 to lie below the basket 3 of the wagon 1. As will now be described, the pull-out rack 92 slides from a retracted position lying entirely below the basket 3 (best shown in FIG. 7) to an extended position projecting rearwardly of the basket (best shown in FIG. 8). The pull-out rack 92 is ideally a flat bed on which an article (not shown) such as a cooler or the like can be conveniently laid and transported at the back of the wagon 1 when the rack 92 is pulled out to its extended position.

Figure 9:
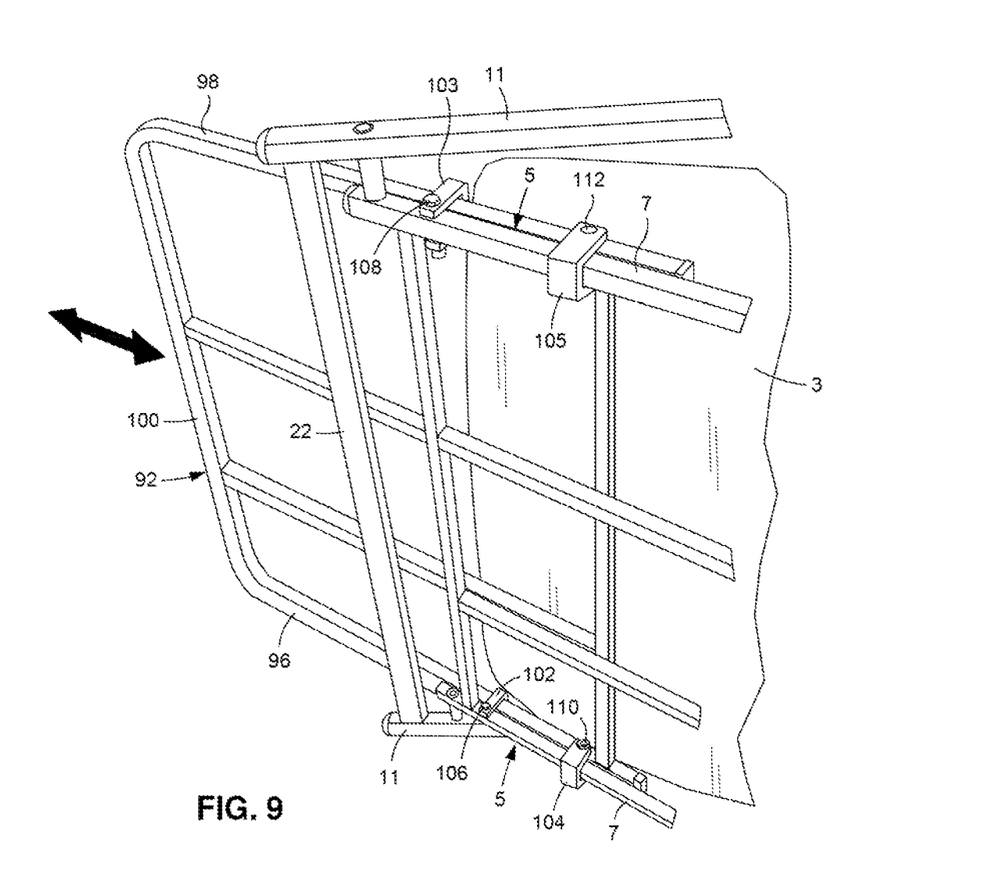
FIG. 9 shows the bottom of the wagon with the pull-out rack coupled to and slidable in and out relative to a basket support rack on which the wagon basket is seated.

As is best shown in FIG. 9, the pull-out article transport rack 92 ideally has a U-shape with a pair of side rails 96 and 98 and an outside rail 100 that is connected between the side rails 96 and 98 to which the aforementioned pulling force is applied. The pull-out rack 92 lies above and is slidable relative to the rear end 7 of the basket support rack 5 between its retracted and extended positions.

The pull-out rack 92 is coupled to the rear end 7 of the basket support rack 5 by pairs of downturned and upturned U-shaped couplers 102, 103 and 104, 105. More particularly, a first coupler 102 of the pair of downturned U-shaped couplers is positioned over one side rail 96 of the pull-out rack 92. The first downturned coupler 102 is connected to the rear end 7 at a first side of the basket support rack 5 by a first fastener (e.g., a bolt) 106. The second coupler 103 of the pair of downturned U-shaped couplers is positioned over the opposite side rail 98 of the pull-out rack 92. The second downturned coupler 103 is connected to the rear end 7 at the opposite side of the basket support rack 5 by a second fastener 108. A first coupler 104 of the pair of upturned U-shaped couplers is positioned under the rear end 7 at the first side of the basket support rack 5 to lie adjacent the downturned coupler 102. The first upturned coupler 104 is connected to the side rail 96 of the pull-out rack 92 by a third fastener 110. The second coupler 105 of the pair of upturned U-shaped couplers is positioned under the rear end 7 at the opposite side of the basket support rack 5. The second upturned coupler 105 is connected to the side rail 98 of the pull-out rack 92 by a fourth fastener 112 to lie adjacent the downturned coupler 103.

Figure 10:
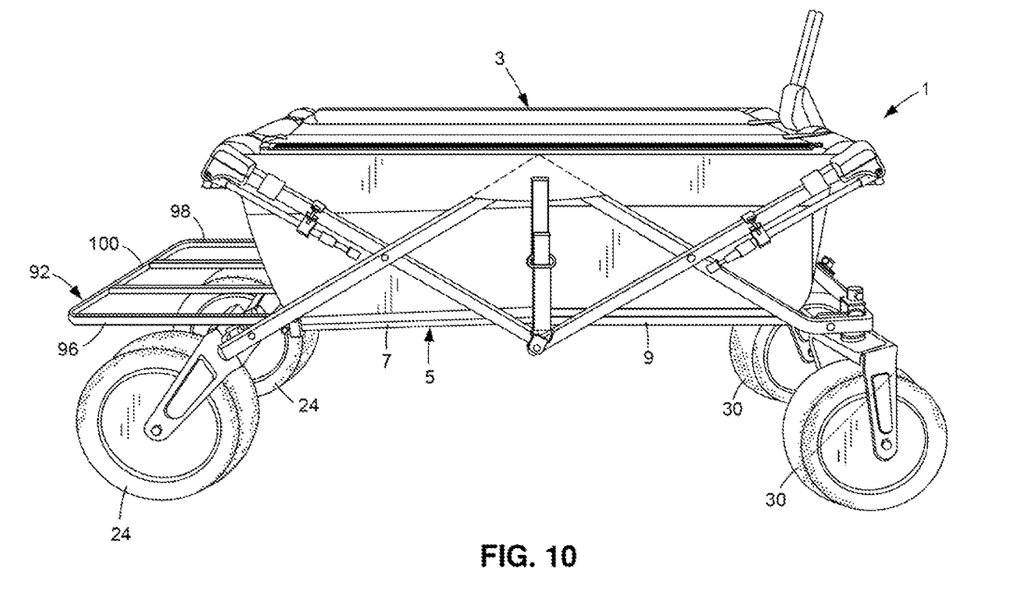
FIG. 10 shows the wagon with the pull-out rack after being pulled out from the back of the wagon to its extended position at which to receive an article to be transported with the wagon.

Accordingly, the pull-out rack 92 will be held in place at the rear end 7 of the basket support rack 5 by the pairs of downturned and upturned U-shaped couplers 102, 103 and 104, 105. As the pull-out rack 92 moves between its retracted and extended positions in response to pushing and pulling forces (represented by the reference arrows shown in FIG. 9) applied to the outside rail 100 of the rack 92, the upturned U-shaped couplers 104 and 105 that are connected by fasteners 110 and 112 to opposite side rails 96 and 98 of the rack 92 will slide with the rack 92 along the rear end 7 of the basket support rack 5. At the same time, the opposite sides 96 and 98 of rack 92 will slide through the downturned U-shaped couplers 102 and 103 that are connected by fasteners 106 and 108 to the rear end 7 of the rack 5. As previously described, when the pull-out rack 92 is pulled out to its extended position as shown in FIG. 10 so as to project rearwardly from the wagon, an article can be laid on the flat bed of the rack 92 at which to be conveniently transported at the back of the wagon 1 along with the contents of the wagon basket 3.

The invention claimed is:

1. A wagon comprising:
a frame;
at least one wheel attached to the frame to enable the wagon to roll from place-to-place;
a basket carried by the frame and having a pair of sides and an open top at which to receive therethrough a variety of articles to be transported by the wagon;
a first flap located at one of the pair of sides of said basket and having a fastener; and
a second flap located at the other one of the pair of sides of said basket and having a fastener,
each of said first and second flaps having a top, a bottom, and a pair of sides, the tops of said first and second flaps being pivotally connected to respective ones of the pair of sides of said basket, whereby said first and second flaps are rotatable relative to said basket from a first position lying adjacent the pair of sides of said basket to a second position lying above the open top of said basket at which said first and second flaps are detachably connected one to another by the respective fasteners thereof to create a cover to close the open top of said basket and simultaneously form a table extending across said basket, and
each of the pair of sides of each of the first and second flaps having a tie down strap extending therefrom, said tie down straps being attached to the frame of said wagon to hold said first and second flaps at said second position under tension at which the open top of said basket is closed and said table is formed across said basket.

2. The wagon recited in claim 1, wherein at least one of said first and second flaps has a pocket within which to receive another article to be transported by the wagon.

3. The wagon recited in claim 1, wherein said first and second flaps are flexible so as to be rotatable between said first and second positions relative to said basket.

4. The wagon recited in claim 1, wherein the fastener of said first flap is a first zipper located at the bottom of said first flap and the fastener of said second flap is a second zipper located at the bottom of said second flap, said first and second zippers being mated to one another, whereby said first and second flaps are detachably connected together at said second position to create said cover to close the open top of said basket and form said table across said basket.

5. The wagon recited in claim 1, wherein the top of each of said first and second flaps has a fastener located thereon, and each of the pairs of sides of said basket has a fastener located thereon and lying adjacent the open top of said basket, the fasteners of said first and second flaps being attached to respective ones of the fasteners of said pair of sides, whereby said first and second flaps are pivotally connected to and rotatable relative to said basket from said first position to said second position.

6. The wagon recited in claim 5, wherein the fastener located on the top of said first flap is a first zipper and the fastener located on the top of said second flap is a second zipper, and wherein the fastener located on one of the pair of sides of said basket is a third zipper and the fastener located on the other one of the pair of sides of said basket is a fourth zipper, said first and third zippers being mated to one another and said second and fourth zippers being mated to one another, whereby said first and second flaps are pivotally connected to and rotatable relative to said basket from said first position to said second position.

7. The wagon recited in claim 1, further comprising a pull-out rack lying below said basket and being responsive to a pulling force applied thereto so as to move from a retracted position lying below said basket to an extended position projecting outwardly from said wagon.

8. The wagon recited in claim 7, wherein the frame of said wagon includes a basket support rack lying below said basket on which said basket is seated, said pull-out rack coupled to said basket support rack and being movable back and forth relative to said basket support rack between said retracted and said extended positions.

9. The wagon recited in claim 8, wherein said pull-out rack lies between said basket and said basket support rack at which said pull-out rack moves back and forth relative to said basket support rack between said retracted and said extended positions.

10. The wagon recited in claim 9, wherein said pull-out rack has first and opposite sides and said basket support rack has first and opposite sides, said wagon further comprising a first U-shaped coupler surrounding one of the first and opposite sides of said pull-out rack and being connected to one of the first and opposite sides of said basket support rack and a second U-shaped coupler surrounding the other one of said first and opposite sides of said pull-out rack and being connected to the other one of the first and opposite sides of said basket support rack, said pull-out rack sliding through said first and second U-shaped couplers when said pull-out rack moves back and forth relative to said basket support rack between said retracted and said extended positions.

11. A wagon comprising:
a frame including a basket support rack having first and opposite sides:
at least one wheel attached to the frame to enable the wagon to roll from place-to-place;
a basket carried by the frame and being seated on the basket support rack of said frame, said basket having a pair of sides and an open top at which to receive therethrough a variety of articles to be transported by the wagon; and
a pull-out rack having first and opposite sides and lying below said basket and coupled to said basket support rack, said pull-out rack being responsive to a pulling force applied thereto to move relative to said basket support rack between a retracted position lying entirely below said basket and an extended position projecting outwardly from one end of said wagon at which to be located to carry a different article to be transported by the wagon; and
a first U-shaped coupler surrounding a first side of the first and opposite sides of said pull-out rack and being connected by a first fastener to a first side of the first and opposite sides of said basket support rack and a second U-shaped coupler surrounding the opposite side of the first and opposite sides of said pull-out rack and being connected by a second fastener to the opposite side of the first and opposite sides of said basket support rack, said pull-out rack sliding through said first and second U-shaped couplers when said pull-out rack moves back and forth relative to said basket support rack between said retracted and said extended positions.

12. The wagon recited in claim 11, further comprising a third U-shaped coupler surrounding the first side of the first and opposite sides of said basket support rack and a fourth U-shaped coupler surrounding the opposite side of the first and opposite sides of said basket support rack and being connected to the opposite side of the first and opposite sides of said pull-out rack, such that said third and fourth U-shaped couplers slide under the first and opposite sides of said basket support rack when said pull-out rack moves back and forth relative to said basket support rack between said retracted and extended positions.

13. A wagon comprising:
a frame;
at least one wheel attached to the frame to enable the wagon to roll from place-to-place;
a basket carried by the frame and having a pair of sides, a first fastener at each of said pair of sides, and an open top at which to receive therethrough a variety of articles to be transported by the wagon;
a first flap located at one of the pair of sides of said basket and a second flap located at the other one of said pair of sides;
each of said first and second flaps having a top, a bottom, a pair of sides, a second fastener at the top thereof and a third fastener at the bottom thereof;
the third fasteners at the bottoms of said first and second flaps being detachably connected to respective ones of the first fasteners at the pair of sides of said basket such that said first and second flaps are rotatable relative to said basket from a first position lying adjacent the pair of sides of said basket to a second position lying above the open top of said basket; and
the second fasteners at the tops of said first and second flaps being detachably connected to one another when said pair of flaps are rotated to said second position by which to hold said pair of flaps together and thereby create a cover to close the open top of said basket and simultaneously form a table extending across the top of said basket.

14. The wagon recited in claim 13, wherein each of said first, second, and third fasteners is a zipper.

15. The wagon recited in claim 13, wherein said first and second flaps are flexible so as to be rotatable between said first and second positions relative to said basket.

16. The wagon recited in claim 13 wherein at least one of said first and second flaps has a pocket within which to receive another article to be transported by the wagon.

17. The wagon recited in claim 13, wherein each of the pair of sides of each of the first and second flaps has a tie down strap extending therefrom, said tie down straps being attached to the frame of said wagon to hold said first and second flaps at said second position under tension at which the open top of said basket is closed and the table across the top of said basket is formed.

* * * * *